INVENTORS
ROBERT J. FANNING &
RONALD G. BRUCE

INVENTORS
ROBERT J. FANNING &
RONALD G. BRUCE
BY
*William J. Miller*

INVENTORS
ROBERT J. FANNING &
RONALD G. BRUCE
BY

United States Patent Office 3,254,212
Patented May 31, 1966

3,254,212
APPARATUS FOR DETERMINING THE CONCENTRATION OF ALUMINUM IN HYDROCARBON STREAMS BY THE USE OF K-CAPTURE RADIOACTIVITY
Robert J. Fanning, Ponca City, Okla., and Ronald G. Bruce, Lake Charles, La., assignors to Continental Oil Company, Ponca City, Okla., a corporation of Oklahoma
Filed Jan. 12, 1962, Ser. No. 165,852
8 Claims. (Cl. 250—43.5)

This invention relates, as indicated, to apparatus for determining the concentration of aluminum in a flowing hydrocarbon stream. More particularly, but not by way of limitation, the invention relates to apparatus which is especially well adapted for determining the concentration of a pyrophoric, highly reactive organo-aluminum compound in a flowing hydrocarbon plant stream, and for controlling the concentration of such organo-aluminum compound in such streams in accordance with such continuous determination.

In our co-pending application for U.S. Letters Patent Serial No. 165,853, filed of even date herewith and assigned to the assignee of the present invention, we describe a novel and highly useful process for determining the concentration of aluminum in hydrocarbon streams. Basically, the process described in the cited application comprises subjecting a sample taken from the stream to the impingement of certain types of radioactive emanations and determining the extent to which the passage of such emanations through the sample is attenuated by the presence of aluminum therein. The preferred source of such emanations is indicated in said application to be 10 millicuries of an iron 55 radioisotope which emits soft X rays having an effective wave length of about 2.05 A. The principle underlying the process is that of employing soft X rays of a wave length such that the other materials, primarily hydrocarbons, which are included in the hydrocarbon stream do not substantially impair or block the transmission of such soft X rays through a sample, while the aluminum, whether in bound or free form, carried by the stream, absorbs X rays of the selected wave length, and thus attenuates or blocks their transmission through the sample. The amount of attenuation, or the decrease in intensity, of the X rays is thus related to the amount of concentration of aluminum in the hydrocarbon stream. By measuring the extent of the attenuation or the decrease in the intensity of the X ray beam, this concentration may be continuously determined as a sample from the process stream is continuously passed through a sample cell where it is subjected to impingement by the X rays.

As mentioned in our cited co-pending application, the process described therein is particularly useful for evaluating the concentration of aluminum present in a hydrocarbon stream as one of several highly reactive, pyrophoric organo-aluminum compounds, such as aluminum trialkyls. To mention but one of the processes in which compounds of this type are employed, such aluminum trialkyls are currently being used in processes for producing relatively high molecular weight alcohols.

A number of unique problems are presented when the process of the invention covered in our co-pending application is applied to such highly reactive pyrophoric organo-aluminum compounds. First, the extremely reactive nature of such compounds requires that the materials of construction employed in the apparatus which is utilized in practicing the process be substantially inert or nonreactive with respect to such compounds. This presents an especially difficult problem with respect to the construction of the sample cell through which the sample from the hydrocarbon stream is passed in order to subject the sample to impingement by the soft X rays. Such material of construction must not only be nonreactive to the organo-aluminum compounds carried by the hydrocarbon stream, but must also be transparent to X rays of the wave lengths which are utilized, and must be of sufficient mechanical strength to withstand relatively high bursting pressures and high temperatures.

A second problem which stems from the highly reactive, pyrophoric character of the organo-aluminum compounds is the danger inherent in handling such materials. For example, the aluminum trialkyls react violently with oxygen upon contact with the air and also react extremely vigorously with water. It is therefore essential that the apparatus employed be constructed to avoid contact between the organo-aluminum compounds and air, and also that solvents and liquid materials other than water, and in any case nonreactive with the aluminum trialkyl, be employed in the process. Moreover, it is highly desirable that the apparatus be constructed with adequate consideration given to certain mechanical safeguards against the contingency of an explosion occurring as the result of inadvertent contact between the organo-aluminum compound and the air.

As a final consideration in practicing the process described in the cited co-pending patent application, it is important that very close and accurate control of the temperature of the sample which is passed through the sample cell be maintained at all times in order that the accuracy of the determination may be maintained within the desired limits. Such fine and exact temperature control requires the utilization of very sensitive temperature control apparatus.

The present invention provides a system or apparatus for continuously determining the concentration of aluminum in a flowing hydrocarbon plant stream and for controlling the aluminum content of such streams in accordance with such continuous determination. The apparatus which is employed, though functioning equally well when used for the determination of many various types of aluminum compounds entrained in the stream, is especially well adapted to meet the particular problems which are posed in making such determination when the types of aluminum compounds entrained in the hydrocarbon stream are highly reactive, pyrophoric organo-aluminum compounds. Two salient and highly novel features of the invention reside in (a) the construction of the sample cell which is utilized for containing the sample as it is subjected to impingement by soft X rays emanating from a suitable radioisotope, and (b) the construction of the novel temperature control means for varying the temperature of the sample as may be desired, and for maintaining the temperature of the sample as it passes through the sample cell at a substantially constant value. The design of the temperature control means is also such that a considerable measure of safety against the possibility of explosion of the organo-aluminum compounds is provided. The apparatus permits the concentration of such organo-aluminum compounds to be continuously determined with a high degree of accuracy, and the construction of the apparatus is such that this accuracy is unimpaired by the undersirable reaction of the organo-aluminum compounds with any of the materials of construction utilized in the apparatus.

From the foregoing description, it will be apparent that the present invention provides a system for continuously determining the concentration of aluminum, whether bound or free, in a flowing hydrocarbon stream in a rapid, efficient and safe manner.

A more specific object of the present invention is to provide a novel sample cell for use in the process of determining the concentration of aluminum in a flowing hydrocarbon stream by utilizing radioactive emanations, which sample cell does not interfere with the accuracy of such determination, and is characterized by a long and trouble-free operating life.

An additional object of the present invention is to provide a highly sensitive and efficient temperature control system for controlling the temperature of a liquid sample as it is continuously passed through a sample cell from a hydrocarbon stream containing an aluminum compound.

A further object is to provide a novel system for safely and continuously determining the aluminum content of a hydrocarbon plant stream carrying a highly reactive, pyrophoric organo-aluminum compound.

Other objects and advantages of the invention, in addition to those hereinbefore described, will become apparent to the reader, and will be better understood upon a reading of the following disclosure in conjunction with a perusal of the following drawings which illustrate our invention.

Figure 1:
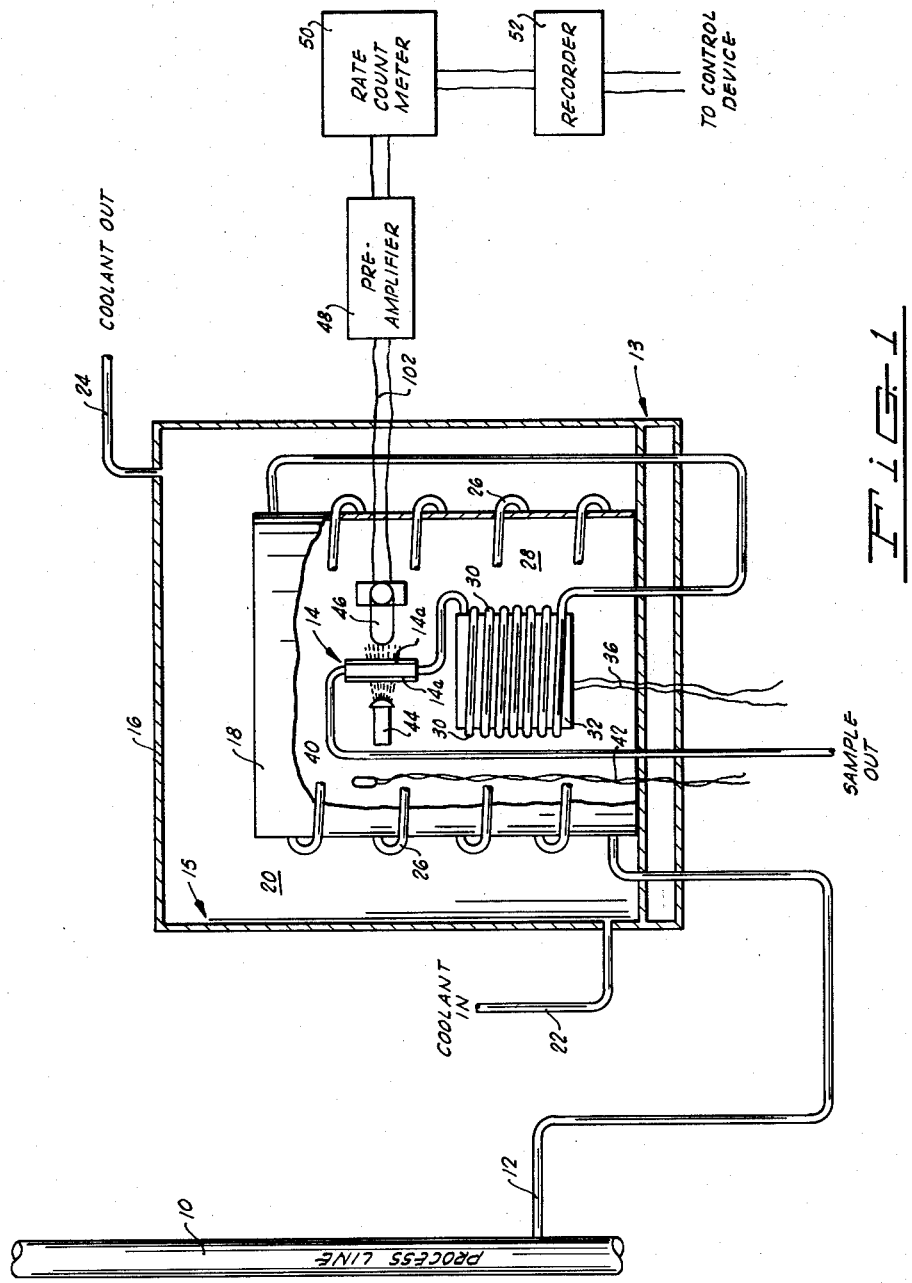
FIGURE 1 is a liquid flow and electronic circuit diagram illustrating the system of the invention.

Referring now to the drawings in detail, and particularly to FIGURE 1, reference character 10 designates a pipeline utilized in a process such as the alcohol synthesis process hereinbefore described, for carrying an organo-aluminum reactant entrained in a hydrocarbon solvent. In the alcohol synthesis process hereinbefore mentioned, the organo-aluminum compound utilized is an aluminum trialkyl, and the hydrocarbon carrier preferably is a kerosene fraction having an API gravity of between 39 and 43. Other hydrocarbon solvents which might be employed include, but are not limited to, a petroleum naphtha fraction containing little or no unsaturated or aromatic hydrocarbons and sold under the tradename Soltrol, and also a substantially pure isooctane stream. The primary considerations in the selection of the hydrocarbon carrier are that it not be reactive with the aluminum trialkyl, and that it contain predominately compounds composed only of carbon and hydrogen atoms. A sampling line or conduit 12 communicates with the process line 10 for conducting the sample to be analyzed from the process line into a sample cell which is located in a measuring head 13 and which is designated generally in FIGURE 1 by reference character 14. The sample cell 14 is provided with a pair of opposed cell faces 14a hereinafter described in detail.

Enroute to the cell 14, sampling conduit 12 passes through the hollow cooling jacket 15 of the measuring head 13. The cooling jacket 15 is of double-walled construction, having an outer wall 16 and an inner wall 18. The material of construction of the cooling jacket 15 is preferably aluminum metal. This provides further assurance against the deleterious contamination of the sample stream, and also provides a material which is nonreactive with the aluminum trialkyl in the event a leak should occur in the sampling conduit 12. Moreover, the aluminum is relatively inexpensive and is of relatively light weight to permit the measuring head to be transported relatively easily from one location to another as may be necessary under differing plant conditions.

The outer and inner walls, 16 and 18, respectively, define a chamber 20 through which a suitable coolant liquid is circulated by way of the coolant inlet conduit 22 and coolant discharge conduit 24. Although other materials may be utilized as a coolant, I prefer to use kerosene for this function because of its ready availability, and its inertness to reaction with the organo-aluminum compounds entrained in the hydrocarbon stream. Materials which react vigorously with the organo-aluminum compounds, such as water, should not be utilized as the cooling material because of the explosion hazard which is involved in such use.

It will be noted that the double-walled construction of the cooling jacket 15 of the measuring head 13 in conjunction with the generally cylindrical geometric configuration of the measuring head provides a safeguard against the occurrence of excessive damage or injury to operating personnel should there occur an explosion at any point inside the measuring head.

After the sampling conduit 12 enters the measuring head 13, it describes a number of convolutions 26 around the internal wall 18 and in the chamber 20 of the cooling jacket 15. There is thus afforded an enhanced opportunity for heat exchange between the sample within the conduit 12, and the coolant material circulating inside the chamber 20. In general, the sample from the process stream will be relatively warm as it enters the cooling jacket 15, having an average temperature of between about 140 and 180° F. The kerosene which is circulated through the chamber 20 in the cooling jacket 15 is maintained at a temperature of approximately 90 to 110° F. so that the temperature of the sample is lowered to this value before the sampling conduit 12 leaves the chamber 20 and enters the space 28 existing inside of the inner wall 18 of the cooling jacket 15. The step of initially cooling the sample to a temperature of between 90 and 110° F. is an important step of the process, and the apparatus which is utilized for achieving this lowering of the temperature is therefore considered to be a salient feature of the invention.

After the sampling conduit 12 enters the space 28 within the inside wall 18 of the cooling jacket 15, it is passed in continuous convolutions 30 around an isothermal block 32. The isothermal block 32 is internally heated by heating elements 34 (shown in FIGURE 2) which are connected to electrical leads 36 passing out through the bottom of the measuring head 13. The temperature of the isothermal block 32 is precisely controlled by means of a thermistor 37 placed in the top of the block, and connected by leads 38 to a control device 39 which controls the heating elements 34 located inside the block. As a further element for accurately controlling the temperature of the isothermal block and the air in the space 28, a thermocouple 40 is provided inside the space 28, and is connected by electrical leads 42 to the heating element control device 39 located outside the measuring head 13. The manner in which the thermistor 37, heating elements 34, and thermocouple 40 function to accurately and safely control the temperature of the isothermal block 32 is subsequently explained in detail.

After passing in heat exchange relation to the isothermal block 32, the sample enters the sample cell 14 where it is subjected to the impingement of soft X rays from the radioisotope source 44. In the preferred embodiment of the invention, the source material which is utilized is a 5 to 50 millicurie sample of iron 55. The soft X rays which are emitted from the iron 55 source 44 are transmitted through the cell 14 via the cell faces 14a of the sample cell 14, and are then detected by a suitable sensing or detecting instrument, such as a Geiger-Müller tube 46 disposed on the opposite side of sample cell 14 from the iron 55 source. The Geiger-Müller tube 46 is sensitive to the soft X rays and provides a small positive pulse for each X ray received.

Figure 2:
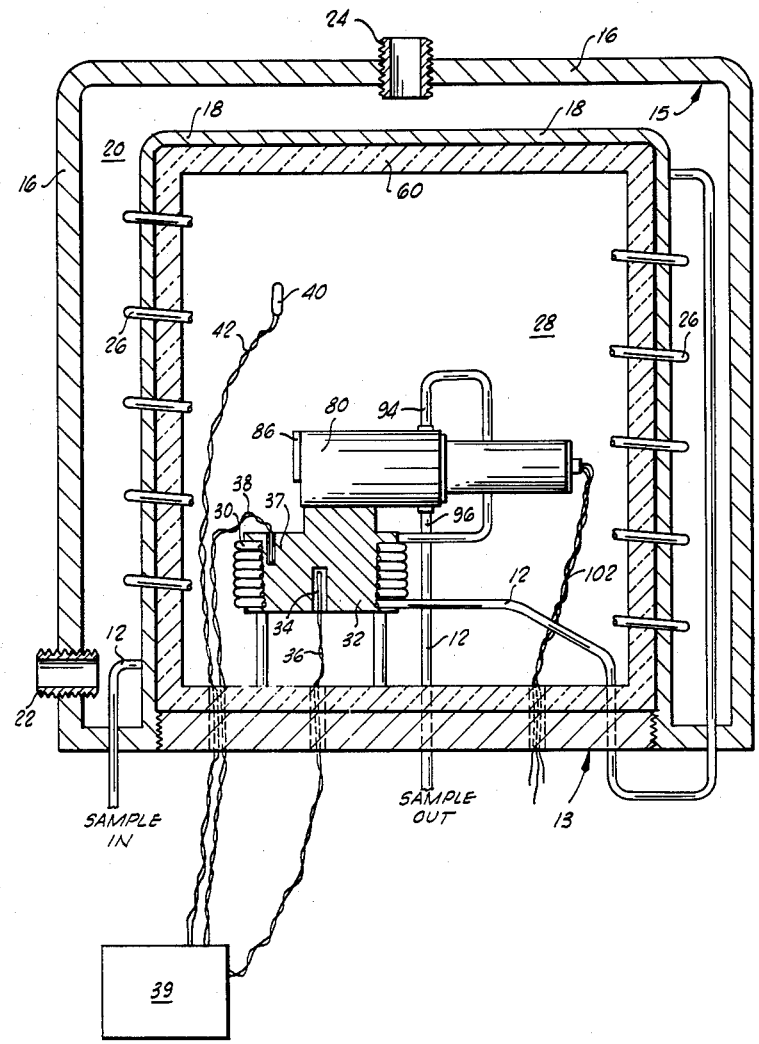
FIGURE 2 is a view partially in section and partially in elevation of the measuring head which constitutes a portion of the system of the invention.

The pulses from the Geiger-Müller tube 46 are transmitted to a preamplifier 48 which may be located outside the measuring head 13, but which preferably is located in a shielded position in the space 28 inside the wall 18 of the cooling shell 15. In FIGURES 1 and 2, the preamplifier is shown outside the measuring head in order to lend clarity to the drawings and the discussion. The preamplifier 48 amplifies and inverts the pulses received from the Geiger-Müller tube 46 and then passes the amplified, inverted pulse signals into a rate count meter 50 which provides an output proportional to the time average of the signal pulses. The zero reading and span of the rate meter 50 may be made adjustable by the provision of suitable span-zero control circuitry if desired. The output from the rate meter 50 is visually displayed on the recorder 52, and the the output signal may also be directed to a suitable control device (not shown) such as a proportioning pump or a solenoid valve for controlling the addition of the aluminum trialkyl or kerosene to the process stream in response to the aluminum trialkyl concentration which is determined to exist at any instant.

After leaving the sample cell 14, the sample flows out of the space 28 in the sampling conduit 12 and is returned to the process line 10. The fluid time constant for the system is approximately four minutes; that is, this is the time required for the sample to flow into the sample cell 14 from the process line 10. The flow rate of the sample through the system is about 100 ml. per minute. It will thus be seen that a continuous determination of the concentration of aluminum in process streams may be carried out with very little time lag occurring between initial diversion of the sample from the process stream 10, and final readout of the concentration value upon the recorder 52. Those skilled in the art will, of course, appreciate that an initial calibration of the apparatus using samples contianing known concentrations of aluminum is required before commencing the determinations.

Figure 3:
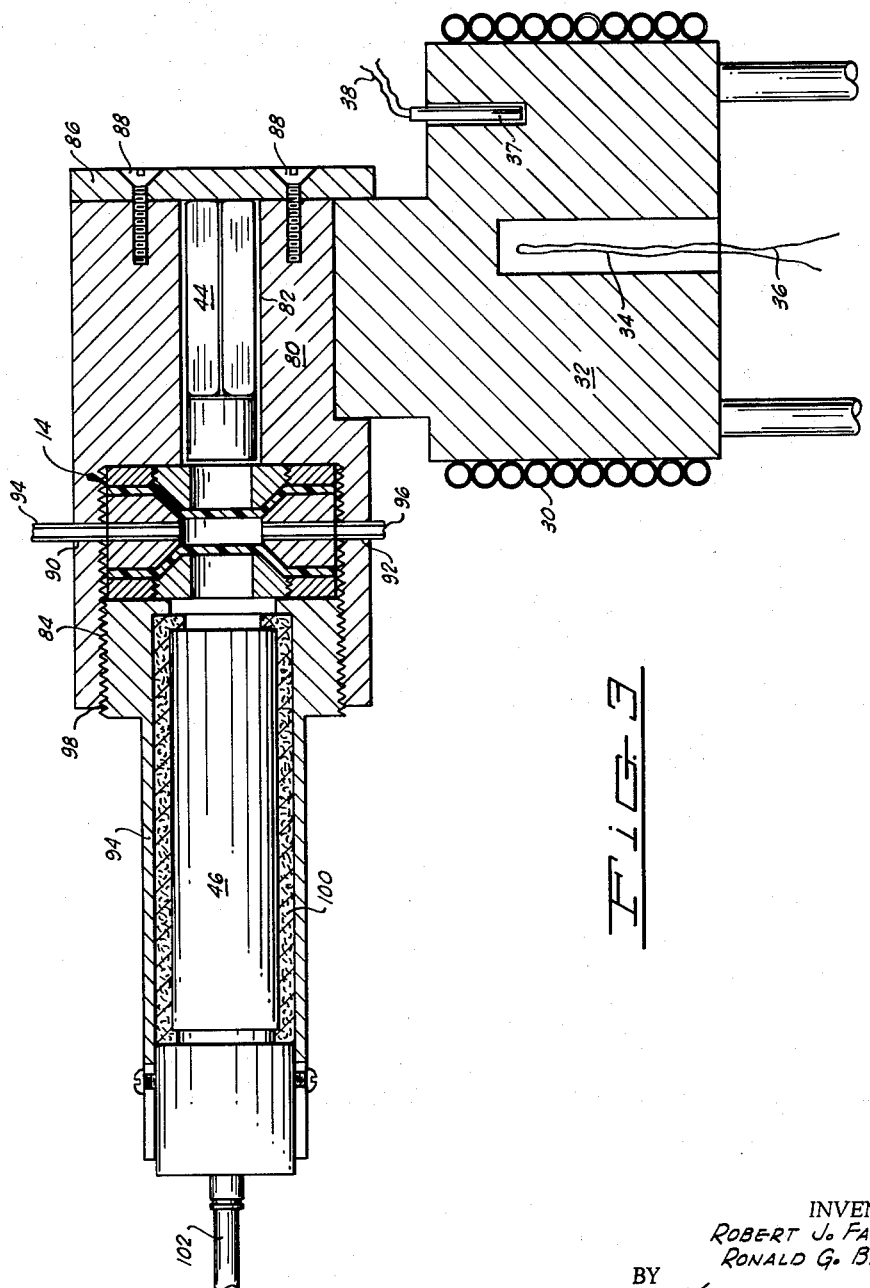
FIGURE 3 is an enlarged sectional view of the isothermal block, sample cell, radioisotope source, and Geiger-Müller tube which are employed in a preferred embodiment of the invention.
Figure 4:
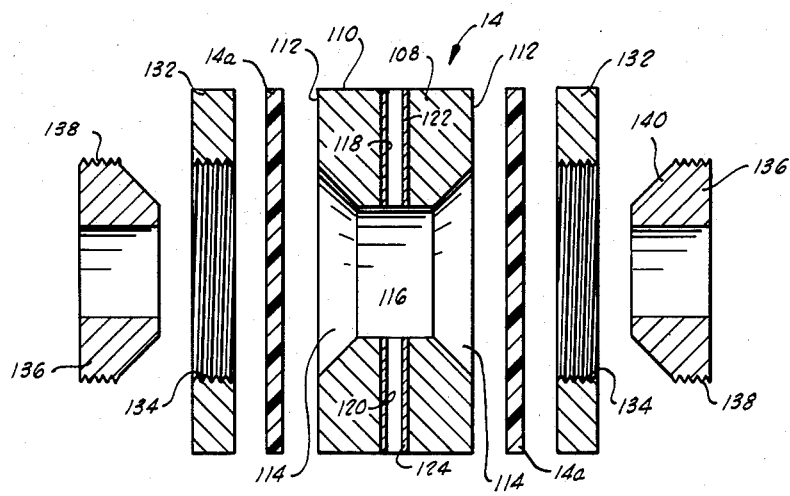
FIGURE 4 is an exploded sectional view of the sample cell which is utilized in a preferred embodiment of the invention.

In the description of the invention to this point, reference has been made to the schematic flow diagram of FIGURE 1. This description has served to provide a general understanding of the system as a whole, and the manner in which the sample stream flows through the system and the pulse signals developed by the Geiger tube 46 are directed to final readout upon the recorder 52. The more detailed, less schematic representations of certain components of the systems which are illustrated in FIGURES 2, 3 and 4 will next be described in order to more succinctly point out the various novel elements of the invention and their functioning.

In FIGURE 2 of the drawings, the measuring head 13 of the system is illustrated. It will be perceived that the outer and inner walls, 16 and 18, respectively, of the cooling jacket 15 are of relatively thick structure to provide a safeguard against the possibility of explosion of the organo-aluminum compounds circulating in the sampling conduit 12. It will be recalled from the previous discussion that the kerosene circulating in the space 20 between the inner and outer walls of the cooling jacket 15 is relatively cool as compared to the temperature of the space 28 inside the innermost wall 18 of the cooling jacket. In order to prevent the existence of any substantial temperature gradient across the space 28 between the isothermal block 32 and the inner wall 18 of the cooling jacket 15, a relatively thick layer of a thermally insulating material 60 is secured to the inside face of the inner wall 18. This provides a relatively high degree of assurance that the temperature in the space 28 surrounding the isothermal block 32 will be maintained at approximately the same temperature as the isothermal block once the warmup period of the system has been completed.

Also from the previous description, it will be recalled that very close control of the temperature of the sample is a factor of utmost importance in achieving a high degree of accuracy in the determination of the aluminum concentration in the hydrocarbon stream. This is true whether the sample in which the aluminum is to be determined contains a highly reactive, pyrophoric oragno-aluminum compound, or other aluminum compounds, or even free aluminum. For example, we have found that a temperautre variation of 0.5° F. in the temperature of the sample passing through the sample cell 14 may cause an error of 0.5 percent in the aluminum determination. In order to provide the positive and accurate control which is required, a novel temperature control system has been devised which permits the sample to be brought well within the 0.5° F. permissible deviation over a range of from 115 to about 200° F. Actually, the maximum upper limit of the temperature range which may be employed is dictated primarily by the ability of the material of construction of the cell 14 to withstand such maximum temperature, and the boiling point of the solvent or hydrocarbon in which the aluminum or aluminum compounds are entrained.

As the sample is passed into the space 28 within the inside wall 18 of the measuring head 13, the sample carrying conduit 12 is passed around the isothermal block 32 in a plurality of convolutions 30 which are soldered to the block with a solder having a high coefficient of thermal conductivity. As the sample first enters these convolutions 30, its temperature will be slightly lower than that of the isothermal block by virtue of having passed in heat exchange relation to the cooler kerosene circulating within the cooling jacket 15. However, the heat exchange between the sample and the isothermal block 32 soon results in the sample being brought up to the temperature of the block.

In order to heat the isothermal block to the required temperature and maintain such temperature at a substantially constant value, a plurality of heating elements 34 are positioned within the block and are connected by electrical leads 36 to a controller device 39 located outside the measuring head. Also connected to the controller device is a thermistor 37 which is placed in the top of the isothermal block 32 and which continuously senses the temperature of the block. The controller device 39 is responsive to the temperature of the block as sensed by the thermistor 37 to energize and de-energize the heating elements 34 as necessary in order to maintain the temperature of the block constant. Of course, any temperature to which it is desired to heat the sample may be set into the controller device, and after allowing an adequate time for the isothermal block to reach the desired temperature, maintenance of this temperature is automatic.

As a safety feature of the invention, and as a further assurance that the controller device 39, heating elements 34 and isothermal block 32 are functioning properly, a thermocouple 40 is positioned in the space 28 inside the inner wall 18 of the cooling jacket 15, and is disposed at some location intermediate between the isothermal block 32, and the insulation 60 which covers the inner surface of the wall 18. The thermocouple 40 is connected to the controller device 39 by electrical leads 42. The function of the thermocouple 40 is to sense the temperature of the air in the space 28 surrounding the isothermal block 32, and to transmit a signal to the controller device 39 corresponding to such sensed temperature. A suitable cutout mechanism (not seen) is provided in the controller device 39 for semipermanently and automatically breaking the circuit between the controller device and the heating elements 34 when the temperature in the space 28, as sensed by the thermocouple 40, exceeds a certain predetermined maximum. Thus, if the controller should in some manner malfunction, permitting the temperature of the isothermal block to run away, the thermocouple 40 will sense the unusual increase in temperature and will deactivate the controller device. Re-establishment of the operation of the controller device 39 must then be manually effected.

The precision control of the sample temperature which is attainable with the present invention is, as has been indicated, one of the invention's most important features. We have found that the temperature control attainable with the system is well within the 0.5° F. temperature fluctuation which can be tolerated in achieving an accuracy of ±0.5% in the aluminum determination. By first lowering the temperature of the sample in sampling conduit 12 to slightly below the desired testing temperature by heat exchange with the cooling medium in space 20, and then raising it by use of the isothermal block 32, the temperature may be brought smoothly and easily up to the desired value without overshooting or hunting. In this way, we have maintained sufficiently close temperature control to repeatedly obtain an accuracy of ±0.1% in the determination of the aluminum trialkyl content of hydrocarbon streams.

The arrangement of the sample cell 14, the Geiger-Müller tube 46, and the iron 55 radiation source 44 is illustrated in FIGURE 3. A housing 80 is secured to the top of the isothermal block 32, and is provided with a bore 82 at one end thereof for receiving the capsule containing the iron 55 source material 44. At its opposite end, the housing 80 is provided with a larger, internally threaded counterbore 84 for receiving the sample cell 14 and the Geiger-Müller tube 46. After the iron 55 radiation source 44 is placed in the bore 82, an end plate 86 is placed over the bore and retains the radiation source in position inside the housing 80. Suitable screws 88 are used for securing the end plate in position. It will be noted that in this position, the iron 55 radiation source is shielded to prevent unnecessary exposure of operating personnel to the radioactive emanations from such source.

In assembling the radiation source, cell, and detector elements, the cell 14 is initially placed in the counterbore 84 of the housing 80, and the inlet and outlet ports of the cell are aligned with an inlet opening 90 and a discharge opening 92 formed in the housing 80. These openings are, in turn, connected to the sampling conduit 12. A housing 94 which contains the Geiger-Müller tube 46, and which is threaded at one of its ends as indicated by reference character 98, is then threaded into the counterbore 84 of the housing 80 until it abuts against the sample cell 14. In this way, the sample cell 14 is retained in fixed position relative to the Geiger-Müller tube 46 and the iron 55 radiation source 44. It will be noted that the Geiger-Müller tube 46 is cushioned in its housing 94 by a layer of felt material 100 which is packed into the space existing between the tube and the walls of its housing 94. The electrical lead for conducting the pulse signals from the Geiger-Müller tube 46 to the preamplifier 48 is designated by reference character 102.

It will be noted that the construction of the assembly which includes the iron 55 radiation source 44, the sample cell 14, the Geiger-Müller tube 46 and its housing 94 is such that relatively little space is occupied by these components of the system, and the benefit of maximum safety to operating personnel is obtained. Moreover, the sample cell 14 is positioned in relatively close proximity to the isothermal block 32, and is located inside a housing 80 which is in thermal conducting contact with the isothermal block. This construction assists in permitting the sample cell 14 to be retained at the temperature of the isothermal block 32 at all times during the operation of the system.

Figure 5:
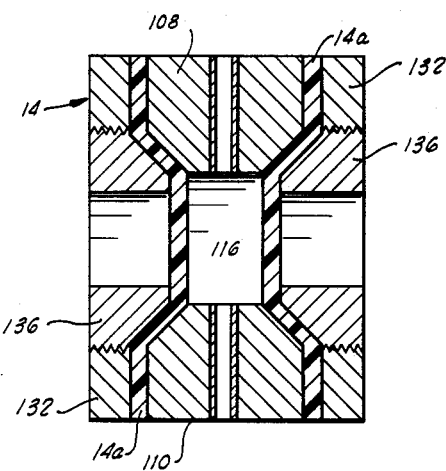
FIGURE 5 is a sectional view through the center of the sample cell shown in FIGURE 4 with the sample cell in its assembled status.

The construction of the novel sample cell 14 of the present invention is illustrated in detail in FIGURES 4 and 5. The cell 14 comprises a block 108 of metallic material, preferably aluminum, which is provided with a generally cylindrical external periphery 110, and a pair of opposed, parallel end surface 112, each of which end surfaces is provided with a centrally located frusto-conical recess 114. The recesses 114 are interconnected by a large bore 116 which extends through the block therebetween, and which, for purposes of explanation, will hereinafter be referred to as the sample chamber. The block 108 is further provided with a radially extending sample inlet port 118 which communicates with the sample chamber 116 at one side thereof, and an opposed, radially extending sample discharge port 120 which communicates with the sample chamber 116 on the opposite side thereof. In a preferred embodiment of the invention, a sample inlet conduit 122 is pressed into the sample inlet port 118, and a sample discharge conduit 124 is pressed into the sample discharge port 120.

To complete the description of the sample cell construction, a pair of cell faces 14a are initially placed in flatly abutting relation to the parallel end surfaces 112 of the cell block 108. A pair of flat retainer plates 132 are then placed against the exposed planar surfaces of the cell faces 14a and are secured through the cell faces to the end surfaces 112 of the metallic block 108. Each of the retainer plates 132 in provided with a threaded bore 134 therethrough which corresponds in diameter to the diameter of the base or largest diametric dimension of each of the frusto-conical recesses 114, and the bore 134 of each of the retainer plates 132 is aligned with one of the recesses when the plates are secured in position.

In addition to other properties which must be possessed by the materials of construction of the cell faces 14a and which are subsequently described, this material must be sufficiently flexible and ductile to permit it to be stretched or distorted from the monoplanar position which it initially assumes to a configuration conforming to the contours of the frusto-conical recesses 114. With the cell face material possessing this property, a pair of plugs 136 which each have a threaded cylindrical outer periphery 138, and a tapered end 140, may then be threaded into the threaded bores 134 in the retainer plates 132 until the tapered ends 140 of the plugs abut against the cell faces 14a. Further threading of the plugs 136 into the bores 134 of the retainer plates 132 distorts or presses the cell faces 14a into the frusto-conical recesses 114 formed in the opposing end surfaces 112 of the cell block 108. When the plugs 136 are threaded into the retainer plates 132 until their ends are flush with the exposed ends of the retainer plates, the sample cell assembly is completed and the cell 14 appears as shown in FIGURE 5.

The distance between each of the cell faces 14a in the cell 14 is of considerable importance, since the amount by which the sample attenuates the soft X ray beam is directly dependent upon the amount of sample through which the beam must pass. We have found that excellent sensitivity may be obtained in the determination of aluminum trialkyls when a cell thickness of about 5 mm. is utilized. However, cell thicknesses between 2 and 7 mm. can also be employed and the particular cell thickness selected will be dependent in any case to a large extent upon the nature of the sample which is to be circulated through the cell. In general, cells thinner than 2 mm. seem to cause a marked loss of sensitivity, while cells thicker than about 7 mm. require the employment of a substantially stronger or more intense source of radiation.

The material of which the cell faces 14a are constructed is a critical factor in the proper construction of the system and constitutes a salient feature of the invention. As has been previously mentioned, a certain amount of flexibility and ductility must characterize this material when the prefered cell construction illustrated in FIGURES 4 and 5 is utilized. However, even when modified embodiments not requiring the extreme distortion of the cell faces as shown in FIGURES 4 and 5 are employed, a number of requirements still must be met by the cell face materials. Since any interference of the cell face material with the passage of the soft X rays therethrough will result in impairment of the sensitivity of the aluminum concentration determination and probable decrease in accuracy, it is essential that the cell face material be substantially transparent to X rays of the wave length utilized in the instant invention—about 2 A. This requirement eliminates the usual metals, as well as those plastics which contain fluorine or heavier elements. In effect, the cell face material should not contain atoms of higher atomic number than oxygen, and even those containing oxygen attenuate the soft X ray beams to an undersirable extent.

The material of which the cell faces 14a are constructed must also be inert or nonreactive with respect to the sample and its components. When a highly reactive, pyrophoric organo-aluminum compound, such as the aluminum trialkyls, is present in the sample, this requirement becomes of extreme importance. We have found that many of the plastic materials which appear to possess the other properties requisite of the cell face material fail to possess sufficient inertness with respect to aluminum trialkyls to be used in the construction of sample cells intended to receive samples carrying this type of compound.

Because of the relatively high temperatures to which the sample may be heated, it is also necessary that the cell face material possess good thermal stability over the range of anticipated operating temperatures. The stability of the material at higher temperatures must be maintained even under operating pressures as high as 100 lbs. per square inch, since the pressure in the process line 10 and sampling conduit 12 may sometimes attain this magnitude. Any slight distortion of the cell faces at these temperatures and pressures will result in a variance of the effective thickness of the cell 14, and since the amount of attenuation of the X ray beam by the sample in the cell is directly proportional to the cell thickness, such distortion will cause the determination results to be erratic and inaccurate.

Lastly, it is desirable that the cell faces 14a be made as thin as possible without sacrifice of their mechanical strength and thermal stability, and without rendering them pervious to one or more of the chemical constituents of the sample.

We have found that a material which meets all of the aforementioned requirements, yet which is relatively inexpensive as compared to several other suitable materials, is high density polymerized polyethylene sold under the tradename of Type No. 2 Marlex by the Phillips Petroleum Company of Bartlesville, Oklahoma. This is the material which has been employed in the construction of the preferred embodiment of the sample cell 14 illustrated in FIGURES 4 and 5. When Type No. 2 Marlex is used as the material of construction of the cell faces 14a, a thickness of 0.015 inch may be employed for the sheet of Marlex at each face Other materials which may be utilized in the construction of the cell faces 14a include beryllium, industrial diamond, certain types of graphite, polypropylene and high molecular weight polyisobutylene.

From the foregoing description of the invention, it will be perceived that the present invention provides a system for determining the concentration of all types of aluminum compounds in various hydrocarbon streams. Included in such compounds are highly reactive, pyrophoric organo-aluminum compounds which normally require extreme caution in handling. Change or variation in the hydrocarbon solvent which carries the aluminum compound to be determined requires a minimum of recalibration of the instrument, since the curves of aluminum concentration vs. counts per minute signalled by the Geiger-Müller tube are of substantially the same slope, regardless of the hydrocarbon solvent used, provided all other parameters, such as cell thickness and temperature are held constant. As an example of the results attainable with the system of the invention, the following table compares the values for the aluminum concentration in three different samples as such values were obtained by wet chemical analysis and by the apparatus of the present invention In each sample, a different concentration of aluminum triethyl in Soltrol was provided.

| Sample | Wet Chemical Analysis, Percent Al | Soft X Ray, Percent Al |
|---|---|---|
| 1 | 4.65 | 4.62 |
| 2 | 4.36 | 4.33 |
| 3 | 4.16 | 4.16 |

The table reflects the excellent accuracy which is attainable with the present invention. It will also be apparent, of course, that the saving in time and required operating personnel which may be realized by using the apparatus of the invention, as opposed to determining the aluminum concentration by wet chemical analysis, is a factor greatly favoring the widespread acceptance and use of the invention.

Although a preferred embodiment of the invention has been hereinbefore described by way of example, a number of changes and modifications in many of the components and elements of the system may be made without departure from the basic principles underlying the invention. For example, several satisfactory cell face materials have been suggested which might be used in place of the Marlex which is used in the preferred embodiment. Also the type of electronic readout system which is employed for converting the pulses produced by the Geiger-Müller tube to visible indicia could also be altered or refined to some extent in order to portray the desired information in a different or more acceptable form. The Geiger-Müller tube might itself be replaced by other types of detecting devices such as a scintillation crystal In fact, the use of the latter type of detector may be highly desirable under circumstances where there is very low attenuation of an extremely intense beam of soft X rays, such as where an amount of radioisotope exceeding 20 millicuries is used, and the sample contains a very low concentration of aluminum. This is because the detecting efficiency or sensitivity of the Geiger-Müller tube appears to fall off somewhat at count levels exceeding 50,000 counts per minute.

The suggested modifications of the invention, as well as a number of other possible changes, will be appreciated by those skilled in the art. Insofar as all such modifications, changes and innovations are employed in an apparatus or system which retains and relies upon the novel, inventive principles hereinbefore described, such apparatus or system is deemed to be included within the spirit and scope of the present invention, except as the same may be necessarily limited by the appended claims

We claim:

1. Apparatus for determining the concentration of aluminum in a carrier material comprising:
    a sample cell for holding a sample, the aluminum concentration of which is to be determined, said cell having a pair of opposed cell faces which are substantially transparent to soft X rays having a wave length of about 2 A., and which are nonreactive with the aluminum compounds in said carrier material;
    a radioactive isotope source of said soft X rays positioned adjacent said cell for transmitting soft X rays through said cell via said cell faces;
    detector means for detecting soft X rays transmitted through said cell and producing signals indicative of the number of said transmitted soft X rays detected by said detector means;
    readout means connected to said detector means for portraying visible indicia indicative of the number of soft X rays transmitted through said cell; and
    means for controlling the temperature of the sample placed in the sample cell, said control means comprising:

heat exchange means for lowering the temperature of said sample before the sample is placed in said cell;

second heat exchange means for raising the temperature of said sample after the sample has passed through said first-mentioned heat exchange means and before the sample enters said cell; and means for varying the amount of heat exchanged between said second heat exchange means and said sample whereby the temperature of the sample as it enters said cell may be adjusted as desired.

2. Apparatus as claimed in claim 1 wherein said radioactive isotope source comprises iron 55.

3. Apparatus as claimed in claim 1 wherein said detector means comprises a Geiger-Müller tube.

4. Apparatus as claimed in claim 1 wherein said readout means comprises:

amplifying means for amplifying the signals produced by said detector means;

rate averaging means connected to said amplifying means for receiving the amplified signals from said amplifying means and producing output signals proportional to the average number of signals received from said amplifying means in a given time; and a recording device responsive to the output signals from said rate averaging means for recording a visible trace indicative of the number of soft X rays transmitted through said cell.

5. Apparatus as claimed in claim 1 wherein said second heat exchange means comprises:

an isothermal block;

a tubular conduit coiled around said block and connected to said sample cell for conveying the sample to said sample cell;

and an insulated chamber surrounding said isothermal block for maintaining the space around said isothermal block at substantially the same temperature as said block.

6. Apparatus as claimed in claim 5 wherein said means for varying the amount of heat exchanged between said second heat exchange means and said sample comprises:

a heating element in said isothermal block for varying the temperature of said block;

a thermistor in said isothermal block for sensing variations in the temperature of said block;

a control device connected to said thermistor and said heating element for energizing and de-energizing said heating element in response to variations in the temperature of said isothermal block as sensed by said thermistor; and a thermocouple in said space inside said insulated chamber and connected to said control device for monitoring the performance of said thermistor, heating element and control device.

7. A system for continuously determining the concentration of aluminum in a flowing hydrocarbon stream comprising:

a sample cell for continuously receiving a sample from a flowing stream and having windows substantially transparent to soft X rays having a wave length of about 2.05 A. and constructed of a material which is substantially unaffected by sample temperatures of at least 180° F. and is nonreactive with the materials carried in said hydrocarbon stream;

a source of radioactive emanations positioned adjacent said cell for transmitting said emanations through the windows of said cell and the sample therein;

a detector for detecting radioactive emanations transmitted through said cell and sample and producing signals in response to said detected emanations;

means for adjusting the temperature of said sample prior to the passage of the sample into the cell; and means for maintaining the temperature of said sample substantially constant at the temperature to which the sample is adjusted, said temperature maintaining means comprising:

(a) a double-walled cooling jacket containing a cooling medium between said walls and defining a space inside the innermost wall thereof;

(b) an isothermal block in said space; and (c) a sampling conduit connected between said flowing hydrocarbon stream and said cell and passing between the walls of said cooling jacket in heat exchange relation to said cooling medium and passing in convolutions around said isothermal block in abutting contact therewith whereby the temperature of said sample may first be lowered by passage through said cooling jacket, then raised and made constant by heat exchange with said isothermal block; and readout means connected to said detector means for portraying visible indicia indicative of the extent to which emanations have been transmitted through said sample and cell.

8. A system as claimed in claim 7 wherein the inner surface of the innermost wall of said cooling jacket is covered with a thermally insulating material so that the temperature of the air around said isothermal block inside said space may be maintained at a temperature substantially equivalent to the temperature of the isothermal block.

References Cited by the Examiner

UNITED STATES PATENTS

| | | | |
|---|---|---|---|
| 2,926,259 | 2/1960 | Dewan | 250—43.5 X |
| 2,937,276 | 5/1960 | Thourson | 250—43.5 X |
| 2,944,153 | 7/1960 | Brown | 250—106 |
| 3,144,559 | 8/1964 | Forrester et al. | 250—106 |

OTHER REFERENCES

Beta-Ray-Excited Low-Energy X-Ray Sources, by L. Reiffel from Nucleonics, Volume 13, No. 3, March 1955, pages 22, 23 and 24.

Gamma Density Controls Extraction Column, by B. G. Ryle, from Chemical Engineering Progress, Volume 53, No. 11, November 1957, pages 551 to 555.

References Cited by the Applicant

UNITED STATES PATENTS

| | | |
|---|---|---|
| 2,501,174 | 3/1950 | Herzog. |
| 2,534,352 | 12/1950 | Herzog. |
| 2,613,325 | 10/1952 | Herzog. |
| 2,613,326 | 10/1952 | Herzog. |
| 2,744,199 | 5/1956 | Juterbock et al. |
| 2,873,377 | 2/1959 | McKay. |
| 2,883,542 | 4/1959 | Jacobs. |
| 2,899,555 | 8/1959 | Fries. |
| 2,937,275 | 5/1960 | Thourson et al. |
| 2,938,119 | 5/1960 | McKay. |

RALPH G. NILSON, *Primary Examiner.*

ARCHIE R. BORCHELT, *Examiner.*